United States Patent [19]

Evans

[11] 4,299,537
[45] Nov. 10, 1981

[54] INTERLINKED VARIABLE-PITCH BLADES FOR WINDMILLS AND TURBINES

[76] Inventor: Frederick C. Evans, 30 James St., Pittenweem, Fife, Scotland

[21] Appl. No.: 155,462

[22] Filed: Jun. 2, 1980

[30] Foreign Application Priority Data

Jun. 19, 1979 [GB] United Kingdom ............... 21252/79

[51] Int. Cl.³ .............................................. F03D 7/06
[52] U.S. Cl. .................................. 416/119; 416/108; 416/132 B
[58] Field of Search ................. 416/17, 109, 111, 119, 416/197 A, 108, 135 A, 132 B

[56] References Cited

U.S. PATENT DOCUMENTS

| | | |
|---|---|---|
| 622,115 | 3/1899 | Carlson ........................... 416/119 X |
| 1,139,103 | 5/1915 | Clade ................................. 416/119 |
| 1,190,630 | 7/1916 | Clade ............................. 416/111 X |
| 1,535,585 | 4/1925 | Dyer ............................... 416/119 X |
| 4,052,134 | 10/1977 | Rumsey ............................. 416/119 |
| 4,180,367 | 12/1979 | Drees ................................. 416/119 |

FOREIGN PATENT DOCUMENTS 530231 12/1921 France ................................ 416/119
319963 10/1929 United Kingdom ................ 416/116

Primary Examiner—Everette A. Powell, Jr.

[57] ABSTRACT

Disclosed herein is a windmill comprising a vertical shaft mounted for rotation about its longitudinal axis, a number of blades each pivotally mounted for angular orientation about a longitudinal axis disposed parallel to the axis of rotation of the vertical shaft, supporting arms extending radially outwardly from the vertical shaft for supporting each blade, and interconnecting links connecting each of the blades to a junction adjacent the vertical shaft longitudinal axis for controlling the angular orientation of the blades relative to the supporting arms. The interconnecting links have inner ends connected to the junction and connect the blades together at corresponding points so that the blades counterbalance each other to resist centrifugal force during rotation of the windmill. A control or spring arrangement in the form of a rod is connected to the main shaft and to the junction of the links for allowing and controlling displacement of the junction to allow pivoting of the blades due to the force of the wind, the instantaneous pitch angles of all the blades being interdependent.

9 Claims, 4 Drawing Figures

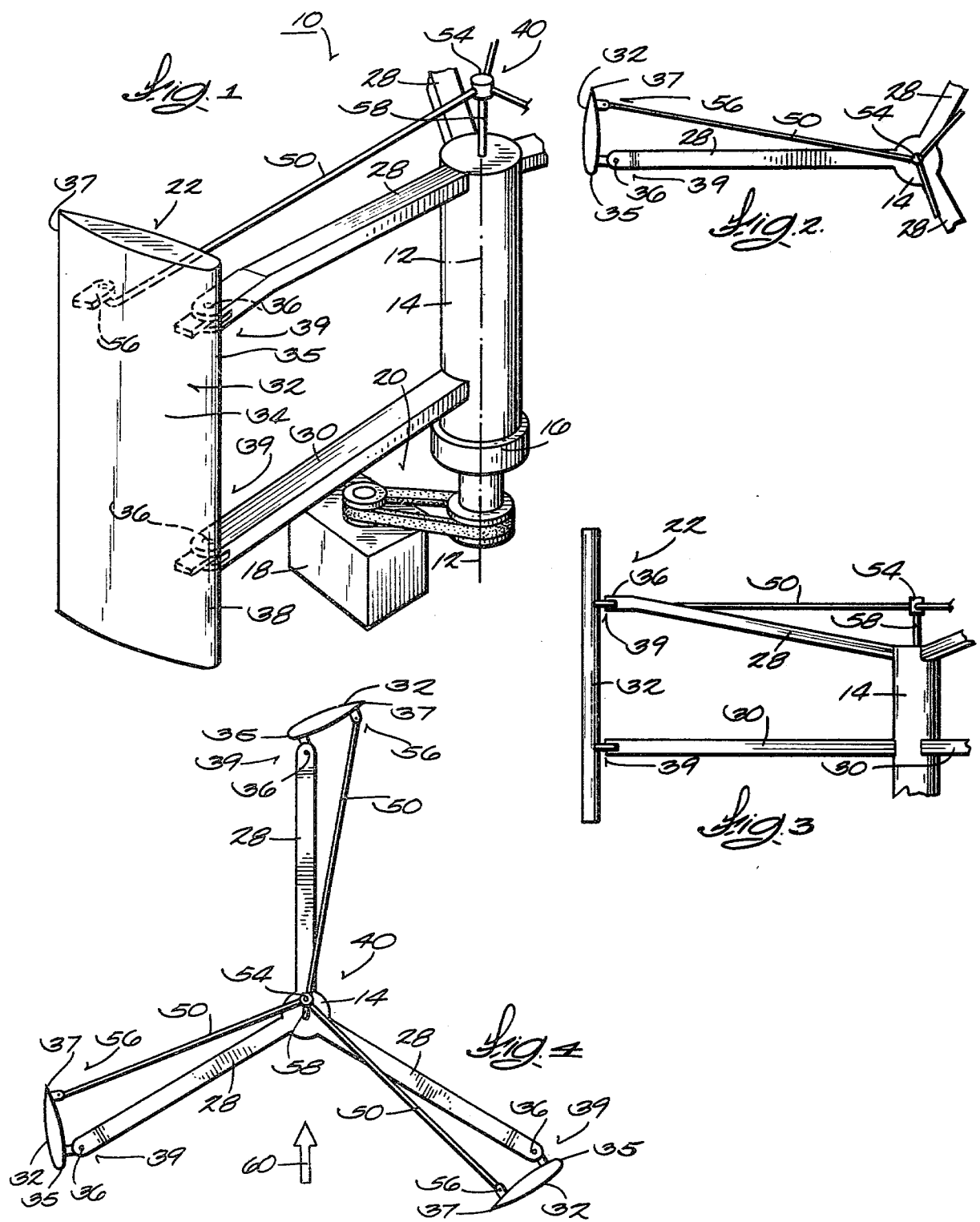

INTERLINKED VARIABLE-PITCH BLADES FOR WINDMILLS AND TURBINES

FIELD OF THE INVENTION

This invention relates to an improved method of construction of that class of windmill in which the pitch of the blades is varied by the force of the wind. It is also applicable to any turbine, whether working in air or another fluid, provided the general configuration is similar to that of a vertical-axis windmill, i.e. the axis of rotation is substantially at right angles to the direction of flow of the fluid.

BACKGROUND OF THE INVENTION

Vertical-axis windmills in which the variation of the pitch angle of the blades is achieved by the pressure of the wind on the blades are well known. In this regard, attention is directed to the following patents which generally disclose vertical-axis windmills:

United States Patents Nos.

Carlson 622,115 Issued Mar. 28, 1899;
Zanoski 2,038,467 Issued Aug. 30, 1934;
Thomas 4,115,027 Issued Sept. 19, 1978;
de Haas 4,032,257 Issued June 28, 1977.

Foreign Pat. Nos.

Germany 342,778 Issued Oct., 1921;
Germany 2,602,380 Issued July, 1976;
British 13,700 Issued June, 1903;
Franc Rondeau 530,231 Issued Dec., 1921;
France Fassel 2,291,381 Issued June, 1976.

SUMMARY OF THE INVENTION

The invention provides a windmill which comprises a vertical shaft mounted for rotation about its longitudinal axis, a number of blades each pivotally mounted for angular orientation about a longitudinal axis disposed parallel to the axis of rotation of the vertical shaft, supporting arms extending radially outwardly from the vertical shaft for supporting each blade, and interconnecting link means connecting each of the blades to a junction adjacent the vertical shaft longitudinal axis for controlling the angular orientation of the blade relative to the supporting arms.

In accordance with an embodiment of this invention, the interconnecting link means provides for the interconnection of corresponding points on the blades of the vertical-axis windmill, and includes links which preferably take the form of rods or wires radiating from a junction, adjacent, or on or near the axis of rotation of the windmill. The position of the junction is controlled by the control means, which may take the form of a spring or other controlling device.

As the windmill rotates, the blades will normally tend to pivot on their individual axes under the influence of centrifugal force. In accordance with this invention, this kind of pivoting will be prevented by the tension in the links, so that the blades do not require counterweights to counteract the centrifugal force. In effect the blades are all acting as mutual counterweights for each other. On the other hand, the pivoting of the blades due to the force of the wind can still occur because all blades will experience a force due to the wind in substantially the same direction, i.e. downwind, so that the junction of the links will move downwind to an extent determined by the wind speed and the strength of the spring or other controlling force. In steady wind conditions the junction will remain approximately stationary at a point downwind of the axis of rotation, and each blade will experience a cyclic variation of pitch as the windmill rotates.

In accordance with the present invention, individual control springs or other individual control devices for each of the blades, as are disclosed in the aforementioned prior art machines, will no longer be necessary. The controlling effect of the interconnecting link means or system of links on the pitch of the blades will be operative, with the advantage that the whole blade assembly rotates as one, so there is no friction or wear caused by relative motion. The principle of operation is also different from prior art machines in that the force causing the blades to pivot is directly due to the wind. A further advantage in accordance with the present invention is that the pivot points for the blades need not coincide with the center-line of the section of the blades, as occured with prior art machines, since the tendency for aerodynamic drag to cause an unwanted component of pivoting of the blades will be overcome by the links. This means that the blades can be made stronger since the pivot bearings can be external if required. A further advantage is that the instantaneous pitch angles of all the blades are interdependent, so there is an averaging effect which will tend to overcome any tendency to oscillation or other undesirable movements such as are sometimes found in prior art machines with individual pitch controls. It should be noted, however, that the use of the interconnecting link means described herein is not incompatible with individual pitch controls and counterweights, and it may be desirable for some applications to use a combined system.

Other objects and advantages will be pointed out in, or be apparent from, the specification and claims, as will obvious modifications of the embodiment shown in the drawings.

BRIEF DESCRIPTION OF THE DRAWINGS

FIG. 1 is a fragmentary, perspective and partially diagrammatic view of a windmill device which embodies features of the invention;

FIG. 2 is a top diagrammatic view of a portion of the windmill device of FIG. 1 showing a blade in a undeflected position;

FIG. 3 is a side view of a portion of the windmill shown in FIG. 2;

FIG. 4 is a top diagrammatic view of the windmill device similar to FIG. 2, except that all the blades are shown in a downwind deflected position.

DESCRIPTION OF THE PREFERRED EMBODIMENT

A windmill device 10 is shown in FIG. 1 and, in response to the prevailing wind, is operable to rotate about a generally vertical primary axis of rotation 12.

More particularly, a vertical main shaft 14 is journaled in suitable conventional bearings, for example 16, for axial rotation on the primary axis 12. The primary axis is defined by the longitudinal axis of shaft 14. The device 10 can be used to convert wind energy to power by driving a load 18. The transmission of force to the load can be in any conventional manner, for example the illustrated belt and pulley assembly 20.

A blade assembly 22 is operative to catch the wind and cause the shaft 14 to rotate about the primary axis 12. More particularly, three separate support arm assemblies each comprising upper and lower arms 28 and 30 extend radially outwardly relative to the primary axis, the inner ends of arms 28 and 30 being welded or otherwise securely fastened to the main shaft 14. It should be appreciated that the number of support arm assemblies 28 and 30 can vary; however, for most efficient operation, the support arm assemblies 28 and 30 should be equally spaced about the primary axis. In the illustrated embodiment, the three support arm assemblies 28 and 30 are each equally separated by approximately 120 degrees.

A blade 32 is pivotally supported at the end of each pair of arms 28 and 30 at a distance outwardly spaced from the primary axis 12. FIG. 1 shows only one blade 32; however, it should be appreciated that each support arm assembly 28 and 30 carries a blade 32 constructed and operable as hereafter described.

As illustrated, the blade 32 is generally rectangularly shaped in vertical cross section and has upstanding sidewalls 34. The sidewalls 34 may have a flat outer contour; however, in the illustrated preferred embodiment, the sidewalls 34 are bowed between a leading edge 35, tapering to a trailing edge 37. In cross section, blade 32 takes the form of an aerofoil. The aerofoil section is more desirable than a flat section because of its ability to produce a large aerodynamic reaction, or lift, while at the same time producing relatively small resistance, or drag, parallel to its direction of motion.

In accordance with this invention, blade 32 is pivotally supported at the end of arms 28 and 30 by a suitable external pivot connection, generally designated 39, and which includes pins 36 which define a secondary axis of rotation 38 which is parallel to primary axis 12. The blade 32 is mounted by pins 36 such that the leading and trailing edges 35 and 37 are generally parallel to the secondary axis 38. With this construction, the pivotally mounted blade 32 is movable between differing angular orientations relative to the arms 28 and 30. Therefore, the blade 32 is capable of moving to change its angle of incidence relative to the wind over a range of wind speeds.

To control the pivotal movement of the blade 32 about the pins 36 for the purpose of achieving the most effective angle of incidence through a range of wind speeds, the device 10 includes interconnecting link means, generally designated 40. The link means 40 may be variously constructed to cause the blade 32 to rest at a predetermined angle of incidence. It may also yieldably bias the blade 32 to a normal position and oppose angular orientation away from the normal position so as to continuously and automatically trim the blade 32. The construction selected depends upon the operational objectives sought, be they to operate the windmill device 10 at a constant speed, or to operate the device 10 at constant torque, or to maximize the total energy output for a particular range of wind speed or loading conditions.

While various interconnecting link means arrangements could be utilized, in the preferred embodiment illustrated, such link means 40 comprises three rods or links 50 having inner ends suitably joined together at a junction 54, and having outer ends connected by suitable pivot connections, generally designated 56, to corresponding points of the blades 34, displaced from the support arms 28, as illustrated.

The position of the junction 54 is adjacent, meaning on or near, the primary axis of the vertical shaft 14, and such position is controlled by control means, preferably in the form of a vertical rod 58. The rod 58 includes a lower end which can be connected, for example, by welding, to a central point of the top surface of the main shaft 14. The upper end of the control means or rod 58 is suitably connected to the inner ends of the links or rods 50 at the junction 54, as illustrated. The control means or rod 58 operates as a spring and controls displacement of the junction 54 for allowing pivoting of the blades 32 about pins 36 due to the force of the wind, the instantaneous pitch angles of all the blades being interdependent. Other possible control means to bias or control displacement of the junction 54 may be used, within the principle of this invention.

Referring to the embodiment illustrated, the control means or rod 58 acts as a spring, shown in FIG. 2 in its normal position, in which the blade 32 is disposed generally perpendicular to the radial extension of the support arm assemblies 28 and 30. The leading edge 35 points toward the direction of rotation desired. Angular displacement of the blade 32 from this normal position will be resisted by the control means or rod 58.

FIGS. 1 and 2 show the blade 32 in the undeflected, or zero-pitch position. FIG. 4 shows the case where the blades are being deflected by the wind. The direction of the wind is indicated by an arrow, 60. All blades will have their trailing edges deflected downwind, with the result that the junction, 54, will be deflected downward of the axis of rotation as shown, to an extent determined by the strength of the control means or rod 58, which operates as a spring. As the windmill rotates during steady wind conditions, the position of the junction 54 will remain approximately constant, and the variation of pitch angle with angular position of the windmill will be approximately sinusoidal in this example. Any small angular movements of the links can be accommodated by making the links flexible, or by providing bearings or pivots at one or both ends of each link.

The windmill device 10 described herein has a self-starting property, and as a result of the interconnecting link means, the blades do not require counterweights to counteract centrifugal force, since the blades are all acting as mutual counterweights for each other. As described above however, pivoting of the blades due to the force of the wind can still occur.

Although the present invention is discussed in connection with a particular embodiment thereof, it will be apparent to those skilled in the art that various changes and modifications may be made thereon without departing from the spirit of the invention or from the scope of the appended claims.

I claim:
1. A windmill comprising a vertical shaft mounted for rotation about its longitudinal axis, a number of blades each pivotally mounted for angular orientation about a longitudinal axis disposed parallel to the axis of rotation of the vertical shaft, supporting arms extending radially outwardly from the vertical shaft for supporting each blade, and interconnecting link means connecting each of said blades to a junction adjacent said vertical shaft longitudinal axis for controlling the angular orientation of the blades relative to the supporting arms, said interconnecting link means comprising a plurality of elongated rigid non-extensible members each having an inner end and a radially outer end, said inner ends being fixedly joined together at said junction, and said mem- bers extending radially outwardly from said junction and having outer ends connected to said blades, and means for resiliently preventing movement of said junction away from said vertical shaft longitudinal axis.

2. A windmill according to claim 1 further comprising external pivot connections respectively connecting said supporting arms to said blades.

3. A windmill according to claim 1 wherein said outer ends are connected to said blades at corresponding points and whereby said blades counterbalance each other so that angular orientation of the blades is substantially unaffected by centrifugal force during rotation of the windmill.

4. A windmill according to claim 1 wherein said means for resiliently preventing movement of said junction controls displacement of said junction for allowing pivoting of said blades due to the force of the wind, the instantaneous pitch angles of all the blades being interdependent.

5. A windmill according to claim 1 wherein said rigid members comprise rigid rods each having an inner end connected to said junction and extending radially outwardly from said junction and each having an outer end connected to a separate one of said blades at a point displaced from the support arms supporting said one of said blades.

6. A windmill according to claim 5 wherein said means for resiliently preventing movement includes control means connected to said vertical shaft and to said rod inner ends at said junction, and operative for controlling displacement of said junction in a downward direction for allowing pivoting of said blades due to the force of the wind, the instantaneous pitch angles of all the blades being interdependent.

7. A windmill according to claim 6 wherein said control means comprises a rod extending from said vertical shaft and connected to said rod inner ends at said junction.

8. A windmill according to claim 7 wherein said blades are of aerofoil cross section.

9. A turbine comprising a shaft mounted for rotation about its longitudinal axis, a number of blades each pivotally mounted for angular orientation about a longitudinal axis disposed parallel to the axis of rotation of the shaft, supporting arms extending radially outwardly from the shaft for supporting each blade, and interconnecting link means connecting each of said blades to a junction adjacent said shaft longitudinal axis for controlling the angular orientation of the blades relative to the supporting arms, said interconnecting link means comprising a plurality of elongated rigid non-extensible members each having an inner end and a radially outer end, said inner ends being fixedly joined together at said junction, and said members extending radially outwardly from said junction and having outer ends connected to said blades, and means for resiliently preventing movement of said junction away from said vertical longitudinal axis.

* * * * *